(12) United States Patent
Saballus et al.

(10) Patent No.: US 10,445,155 B2
(45) Date of Patent: Oct. 15, 2019

(54) METHOD FOR THE COMMUNICATION BETWEEN SOFTWARE COMPONENTS IN A MOTOR VEHICLE

(71) Applicant: Robert Bosch GmbH, Stuttgart (DE)

(72) Inventors: Bjoern Saballus, Remseck am Neckar (DE); Simon Kramer, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 31 days.

(21) Appl. No.: 15/737,629

(22) PCT Filed: May 27, 2016

(86) PCT No.: PCT/EP2016/061973
§ 371 (c)(1),
(2) Date: Dec. 18, 2017

(87) PCT Pub. No.: WO2016/202553
PCT Pub. Date: Dec. 22, 2016

(65) Prior Publication Data
US 2018/0189120 A1 Jul. 5, 2018

(30) Foreign Application Priority Data
Jun. 19, 2015 (DE) .......... 10 2015 211 316

(51) Int. Cl.
*G06F 9/54* (2006.01)
*B60W 30/00* (2006.01)
(Continued)

(52) U.S. Cl.
CPC .......... *G06F 9/544* (2013.01); *B60R 16/0231* (2013.01); *B60W 30/00* (2013.01); *H04L 67/12* (2013.01)

(58) Field of Classification Search
None
See application file for complete search history.

(56) References Cited

U.S. PATENT DOCUMENTS

| 2009/0172655 A1* | 7/2009 | Ivanov | G06F 8/65 717/173 |
| 2012/0210160 A1* | 8/2012 | Fuhrman | G05B 19/0428 714/4.12 |
| 2012/0227091 A1 | 9/2012 | Smith | |

FOREIGN PATENT DOCUMENTS

DE 102007051912 A1 4/2009

OTHER PUBLICATIONS

Pham et al., Reconfigurable ECU communications in Autosar Environment, 2009, IEEEretrieved, pp. 581-585, retrieved from https://ieeexplore.ieee.org/stamp/stamp.jsp?tp=&arnurnber=5399289 on Mar. 8, 2019 (Year: 2009).*

(Continued)

*Primary Examiner* — Tuan C Dao
*Assistant Examiner* — William C Wood
(74) *Attorney, Agent, or Firm* — Norton Rose Fulbright US LLP; Gerard Messina

(57) ABSTRACT

A method for the communication between software components in a motor vehicle, the software components being able to be operated in different operating modes, wherein the software components communicate with one another in different ways in the different operating modes, and at a first point in time, it is determined which software components communicate with one another and in which way in the different operating modes, and a separate communication profile is determined on that basis for each of the different operating modes, the software components being operated in the different operating modes at a second point in time, and one or more computer unit(s) executing the software components is/are configured in accordance with a corresponding communication profile of the respective operating mode.

17 Claims, 1 Drawing Sheet

(51) Int. Cl.
*H04L 29/08* (2006.01)
*B60R 16/023* (2006.01)

(56) References Cited

OTHER PUBLICATIONS

International Search Report dated Aug. 19, 2016, of the corresponding International Application PCT/EP2016/061973 filed May 27, 2016.

* cited by examiner

METHOD FOR THE COMMUNICATION BETWEEN SOFTWARE COMPONENTS IN A MOTOR VEHICLE

FIELD

The present invention relates to a method for the communication between software components in a motor vehicle and to a computer unit and a computer program for executing the present method.

BACKGROUND INFORMATION

Software components in a motor vehicle that are running on one and the same computer unit or on different computer units, for example, may be operated in different operating modes. The software components communicate with one another and exchange data in these different operating modes.

German Patent Application No. DE 10 2007 051 912 describes a method and a device for configuring a vehicle network; the vehicle network includes a multitude of control units, which exchange messages with one another via at least one bus system; the number of control units and/or the required messages are dependent upon the configuration of the motor vehicle. At least some control units are developed in such a way that their communication behaviors are variable, each message being assigned an unambiguous ID independently of the configuration; in addition, a communications matrix, which includes at least the IDs of the messages that are required for the communication, is set up as a function of the configuration. Moreover, the communication matrix indicates which control unit transmits which message and which control unit receives which message. During an initialization phase, the individual control units adapt their communications behavior in accordance with the transmit and receive requirement of the communications matrix.

SUMMARY

According to the present invention, a method for the communication between software components in a motor vehicle as well as a computer unit and a computer program for its execution are provided. Advantageous further developments are described herein.

In particular, the software components are developed as software components of an embedded system of the motor vehicle, e.g., of a control unit of the motor vehicle. More specifically, the software components communicate with one another during the operation of the motor vehicle and exchange data for operating the motor vehicle, in particular.

The software components or the corresponding embedded system is/are able to be operated in different operating modes. Software components communicate with one another in different ways in the different operating modes. In particular, software components communicate with one another in some of the operating states and not in others.

At a first point in time, it is determined which software components communicate in the different operating modes and in which way in each case. On that basis, a communication profile is determined for each of the different operating modes. Thus, the communication relationships of the individual software components of the corresponding operating mode are stored in the communication profiles.

In particular, communications matrices are determined as communication profiles. In a communications matrix, all communication relationships in a network are combined as a transmitter-receiver relationship, in particular combined in the form of a table.

At a second point in time, the software components are operated in the different operating modes, and the computer unit(s) that execute(s) the software components is/are configured in accordance with the corresponding communication profile of the respective current operating mode. The first point in time precedes the second point in time.

The second point in time especially describes the run time or the regular operation of the software components or the embedded system. The communication profiles are determined at the first point in time prior to such a regular operation of the software components. In particular, the communication profiles are able to be determined anew at the start of each regular operation of the embedded system. However, it is also possible to determine the communication profiles only once, e.g., during a production process of the motor vehicle, such as at an end of the line.

Due to the present method, it is possible to statically preconfigure the communication of the software components by ascertaining the communication profiles at the first point in time. During the run time of the software components, a dynamic and flexible switch between these a priori statically preconfigured communication profiles is able to take place.

In conventional embedded systems in motor vehicles, it is often impossible to modify the resource requirement of the software components during the run time. Generally, the communication structure, i.e., in particular the number of communication channels within a computer unit and/or between computer units, of the software components is preconfigured for all operating modes as a whole, without taking differences between individual operating modes into account. The computer unit(s) is/are rigidly tied to this shared pre-configuration during the run time.

In contrast, in the course of the present method, the communication of the software components is preconfigured separately for each individual operating mode. The configuration of the computer unit(s) takes place individually in each operating mode in accordance with the respective communication profile and in a manner that is individually tailored to the respective operating mode in the most optimal manner. Differences in the resource requirements of the individual operating modes are therefore taken into account.

At the second point in time, during a switch between two of the different operating modes, a switch preferably also takes place between the corresponding communication profiles of these two different operating modes. In particular when a higher-level control software (e.g., a run time system, an operating system) switches between the operating modes, the control software, too, switches between the respective communication profiles. As a result, a dynamic switch between statically preconfigured communication profiles is possible during the run time.

In an advantageous manner, resources are newly distributed at the second point in time in a switch between two of the different operating modes. In this context, resources are to be understood especially as hardware resources that are used for the communication of software components. Preferably, resources refer to communication links or communication channels and/or to memory units, in particular buffer stores. As a rule, resources are limited in embedded systems, but are also able to be dynamically distributed once again by the present method during the run time of the embedded system.

In conventional embedded systems, resources are statically allocated, a priori, to the individual software components prior to their run time. This allocation takes place jointly and for all operating modes as a whole. In the process, resources are statically reserved for the mutual communication of special software components and in most cases may be used exclusively for the communication of these special software components during the run time. Even if these special software components do not communicate with one another in some operating modes, the corresponding allocated resources nevertheless remain reserved for these special software components and go unused in these operating modes.

In contrast, according to one advantageous development of the method according to the present invention, in a switch between two of the different operating modes, resources that are used for the mutual communication of a first number of software components in one of these two operating modes are used in the other one of these two operating modes for a mutual communication of a second number of software components. In each case the use of the resources takes place as a function of the corresponding communication profile of the respective operating mode. In other words, during the run time, resources are newly and flexibly allocated to different software components as a function of the communication profiles. The resources are not exclusively reserved for special software components during the run time.

In the one of these two operating modes, software components belonging to the first number preferably communicate with one another, while they do not communicate with one another in the other one of the two operating modes. Furthermore, in one of these two operating modes, the software components belonging to the second number preferably do not communicate with one another but instead communicate with one another in the other of the two operating modes. In the case of conventional embedded systems, the resources that are allocated to the first number of software components would be used only in the one operating mode and remain unused in the other. Similarly, the resources that are allocated to the second number of software components would remain unused in the one operating mode. In contrast, however, according to this preferred specific embodiment of the method according to the present invention, these resources are able to be newly allocated. In a switch between these respective operating modes, this first number and this second number of software components are able to share resources.

The first and the second number of software components may involve different software components in each case. In the first operating mode, for example, a first software component may communicate with a second software component as the first number, and in the second operating mode, a third software component may communicate with a fourth software component as the second number. On the other hand, the first and the second number of software components may also be at least partially identical, i.e., at least one component is both part of the first and part of the second number of software components. In the first operating mode, for example, a first software component may communicate with a second software component as the first number, and in the second operating mode, the first software component may communicate with a third software component as the second number.

At the first point in time, all possible switches between two of the different operating modes are preferably examined. Preferably, for each possible switch it is individually determined which software components communicate with one another in one of the two operating modes not in the other of the two operating modes. This information is preferably stored in the corresponding communication profiles of the individual operating modes. In particular, the respective first number of software components and the respective second number of software components are thus identified for each possible switch. More specifically, it is stored in the communication profile of a respective operating mode whether in a switch from this operating mode to a special other operating mode, resources that are reserved for a special software component in this operating mode may be used for another software component in the other operating mode.

Preferably, processes or arithmetic operations such as control programs are used as software components. These software components are executed in particular for operating the motor vehicle, e.g., a software in an engine control.

Sensors, actuators, control units, micro-controllers, integrated switching circuits (IC), systems-on-a-chip (single chip system, SoC) are preferably used as computer units that are executing the software components. The software components are preferably executed by a network-on-a-chip (NoC) system. For example, a network-on-a-chip system may be used for the communication in an integrated switching circuit (IC), e.g., for the communication between IP cores (intellectual property cores) in a system-on-a-chip.

A computer unit according to the present invention, such as a control unit of a motor vehicle, is designed, in particular from the aspect of programming technology, to carry out a method according to the present invention.

In addition, the implementation of the present method in the form of a computer program is advantageous since it causes particularly low expense, especially when an executing control unit is also used for other tasks and is therefore provided anyway. Suitable data carriers for making the computer program available, in particular, are magnetic, optical, and electrical memories such as hard disks, flash memories, EEPROMs, DVDs and many others. A download of a program via computer networks (internet, intranet, etc.) is possible as well.

The present invention shows particular advantages when implemented in AUTOSAR or MSR systems.

An important aspect of AUTOSAR is the logical split into the control-unit-specific basic software (BSW) and the control-device-independent application software (ASW). A virtual functional bus system (VFB) lies in between. This virtual functional bus connects all software components, even those that are implemented in different control units. The functional software components (SWC) are strictly separated from one another and from the basic software. They communicate with the other functions and the control-unit interfaces via the AUTOSAR interface. The basic software (BSW) includes the control-unit-specific program components such as the communication interfaces, the diagnostics and the memory management. A core piece of the architecture is the AUTOSAR run-time environment (RTE), a communications layer abstracting according to the principle of a virtual functional bus (VFB) within the sense of a middleware from the real control-unit topology and the communication relations resulting therefrom. Two functions may therefore exchange information with each other without having knowledge of the signal path, using what is known as a communications port of the run-time environment. This mechanism advantageously manifests itself in that functions are able to be developed independently of the topology that later exists in the vehicle. The actual signal paths can now be specified in a dynamic manner according to one specific embodiment of the present invention.

This applies in a similar manner to the manufacturer-supplier relationship (MSR systems).

Additional advantages and developments of the present invention are described herein and are shown in the figures.

The present invention is schematically shown in the figures with the aid of exemplary embodiments and will be described below with reference to the figures.

DETAILED DESCRIPTION OF EXAMPLE EMBODIMENTS

Figure 1:
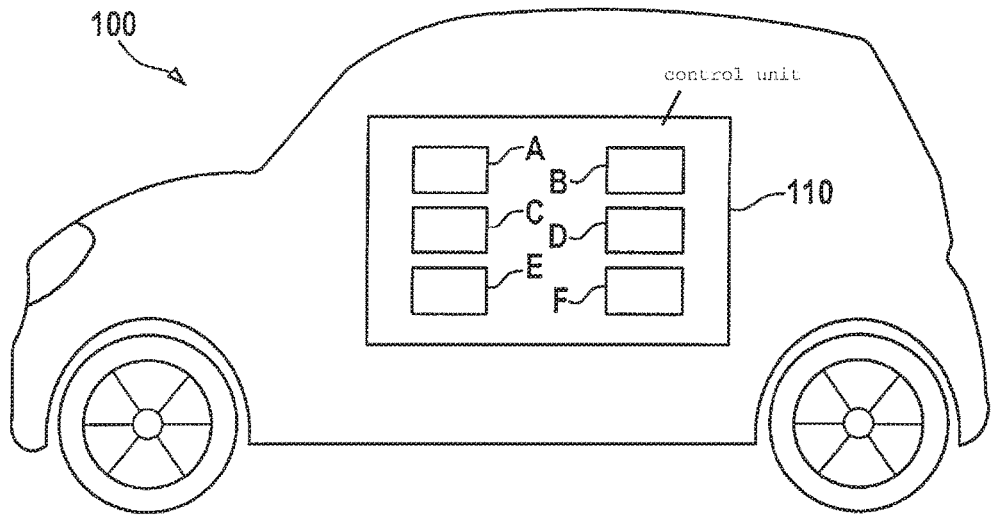
FIG. 1 shows schematically, a motor vehicle having a control unit that is designed to execute a preferred specific embodiment of a method according to the present invention.

FIG. 1 schematically shows a motor vehicle, which is denoted by 100. The motor vehicle has a control unit 110, e.g., an engine-control unit. Control unit 110 in particular represents an embedded system of motor vehicle 100.

Different software components A through F in the form of different control programs or program components are executed in control unit 110 in the course of the operation of motor vehicle 100.

Control unit 110 is able to be operated in different operating modes. During a startup process of the engine, for example, control unit 110 is operated in a first operating mode, and once the engine has been started, it is operated in a second operating mode.

Figure 2A:
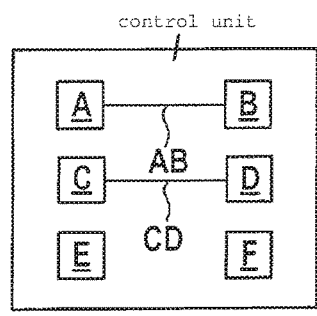
FIG. 2 shows schematically shows the control unit in two different operating modes.
Figure 2B:
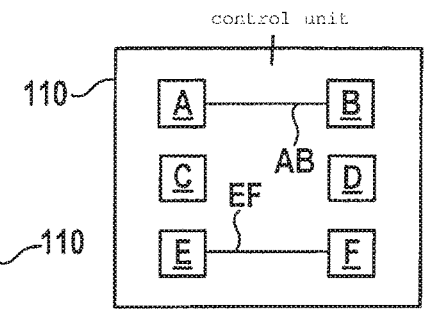

In FIG. 2a, control unit 110 is schematically shown in the first operating mode; in FIG. 2b it is shown in the second operating mode.

Software components A through D are executed in the control unit in the two operating modes. In both operating modes, software components A and B communicate with each other and exchange data, indicated by reference numeral AB. Software components C and D communicate with each other only in the first operating mode, indicated by reference sign CD, and not in the second operating mode. Software components E and F communicate with each other only in the second operating mode, indicated by reference sign EF, but not in the first operating mode.

Figure 3:
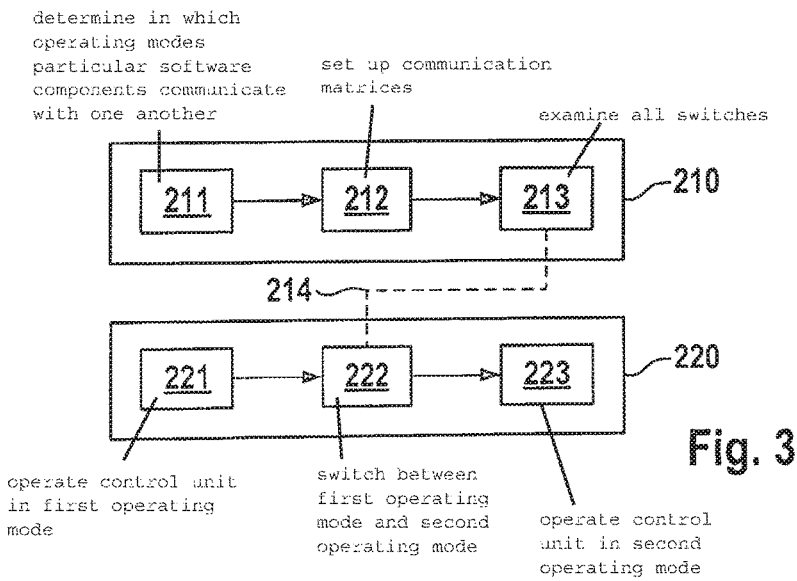
FIG. 3 shows schematically shows a preferred specific embodiment of the method according to the present invention, in the form of a block diagram.

In order to carry out the communication between software components A through F in the two operating modes, control unit 110 is set up, particularly in terms of programming technology, to execute a preferred specific embodiment of a method according to the present invention, which is schematically shown in FIG. 3 in the form of a block diagram.

The respective software components require resources of the control unit for the communication of the software components with one another, especially a communication channel and a buffer store. With the aid of the present method, the software components are able to communicate in the two operating modes in a resource-sparing manner.

Steps 211 through 213 are carried out at a first point in time 210, for example within the course of a programming operation of control unit 110 at the end of the line.

In a first step 211, it is determined in which operating modes which particular software components communicate with one another. As described with reference to FIG. 2a, it is determined in the process that software components A and B as well as software components C and D communicate with each other in the first operating mode. In addition, it is determined that software components A and B as well as software components E and F communicate with each other in the second operating mode.

In step 212, an individual communication profile in the form of a communication matrix is set up for each of the two operating modes. Stored in the communication matrix are the communication relations of software components A through F, which were determined in step 211.

In step 213, all possible switches in the operating modes are examined. In this particular example, the switches from the first to the second operating mode, and from the second to the first operating mode are examined. In the process, it is determined which particular software components communicate with one another in the first operating mode but not in the second operating mode, and vice versa.

Software components C and D are determined as software components that belong to a first number of software components and communicate with each other in the first operating mode but not in the second operating mode. Software components E and F are determined as software components that belong to a second number of software components that communicate with each other in the second operating mode and not in the first operating mode. This information is stored in the communication profiles of the first and the second operating modes.

Steps 221 through 223 are carried out at a second point in time 220, which lies after the first point in time, in particular during the regular operation of control unit 110 while the motor vehicle is being driven.

In step 221, control unit 110 is operated in the first operating mode in order to start the engine. The configuration of control unit 110 is carried out in accordance with the first communication profile. In the process, a first communication channel and a first buffer store are made available for the communication of software components A and B, and a second communication channel and a second buffer store are made available for the communication of software components C and D.

After the engine has been started, a switch between the first and the second operating mode takes place in step 222. In the same way, a switch between the first and the second communication profile occurs. As was checked in step 213 and stored in the communication profile, software components C and D no longer communicate with each other in the second operating mode, but software components E and F communicate instead. During the switch between the first and the second operating mode, resources are newly distributed in step 222 as a function of the communication profiles, indicated by reference numeral 214.

The second communication channel and the second buffer store that are used for the communication of software components C and D in the first operating mode are now allocated to software components E and F.

In step 223, control unit 110 is operated in the second operating mode. The communication of software components A through F is carried out in accordance with the second communication profile. The first communication channel and the first buffer store are used for the communication of software components A and B, and the second communication channel and the second buffer store are used for the communication of software components E and F.

In an analogous manner, it is also possible that the first and the second number of software components are at least partially identical software components. For example, software components C and D may communicate with each other as the first number in the first operating mode and, for example, software components C and F may communicate in the second operating mode as the second number. Similar to the above description, resources that are used in the first operating mode for the communication between software components C and D are in this case also used for the communication between software components C and F in the second operating mode.

What is claimed is:

1. A method for communicating between software components in a motor vehicle, the software components being operated in different operating modes, and the software components communicating with one another differently in the different operating modes, the method comprising:
determining, at a first point in time, which of the software components communicate with one another in the different operating modes and in which way in each case, and a separate communication profile is determined, on the basis of the determining, for each one of the different operating modes; and
operating the software components in the different operating modes at a second point in time, wherein at least one of computer unit executing the software components is configured according to a corresponding communication profile of the respective operating mode;
wherein at the second point in time, in a switch between two of the different operating modes, a switch takes place between the corresponding communication profiles of the two of the different operating modes, and
wherein at the second point in time, in the switch between the two of the different operating modes, communication resources are newly distributed as a function of the corresponding communication profiles of the two of the different operating mode so that the communication resources allocated to a first one of the software components are reallocated, based on the corresponding communication profiles, to a second one of the software components different from the first one of the software components and are no longer allocated to the first one of the software components.

2. The method as recited in claim 1, wherein at the second point in time during the switch between the two of the different operating modes, resources that are used for the communication of a first number of software components in one of the two of the different operating modes are used for a communication of a second number of software components in the other one of the two of the different operating modes as a function of the corresponding communication profiles of the two of the different operating modes.

3. The method as recited in claim 2, wherein the software components that belong to the first number of software components communicate with one another in one of the two of the different operating modes and do not communicate with one another in the other of the two of the different operating modes, and the software components that belong to the second number of software components do not communicate with one another in one of the two of the different operating modes and communicate with one another in the other of the two of the different operating modes.

4. The method as recited in claim 3, wherein at least one of the software components is both part both of the first number of software components and part of the second number of software components.

5. The method as recited in claim 3, wherein at the first point in time, determining, for each possible switch between two of the different operating modes, information regarding which ones of the software components communicate with one another in the one but not in the other of the two operating modes, and the information is stored in the corresponding communication profiles of the respective operating modes.

6. The method as recited in claim 1, wherein the software components are one of AUTOSAR-software components or MSR-software components.

7. The method as recited in claim 1, wherein at the second point in time during the switch between the two of the different operating modes, first resources, that are used for communication between a first pair of the software components and are not used for communication between a second pair of the software components different from the first pair of software components, are reallocated, based on the corresponding communication profiles of the two of the different operating mode, to the second pair of software components so that the first resources are used for communication between the second pair of the software components are not used for communication between the first pair of the software components.

8. The method as recited in claim 7, wherein the first resources include at least one buffer and a channel.

9. The method as recited in claim 1, wherein the communication resources include at least one buffer and a channel.

10. A computer unit or an interconnection of computer units, designed to provide communication between software components in a motor vehicle, the software components being operated in different operating modes, and the software components communicating with one another differently in the different operating modes, the computer unit or interconnection of computer units being designed to:
determine, at a first point in time, which of the software components communicate with one another in the different operating modes and in which way in each case, and a separate communication profile is determined, on the basis of the determining, for each one of the different operating modes; and
operate the software components in the different operating modes at a second point in time, wherein the computer unit or the interconnection of computer units executing the software components is configured according to a corresponding communication profile of the respective operating mode;
wherein at the second point in time, in a switch between two of the different operating modes, a switch takes place between the corresponding communication profiles of the two of the different operating modes, and
wherein at the second point in time, in the switch between the two of the different operating modes, communication resources are newly distributed as a function of the corresponding communication profiles of the two of the different operating mode so that the communication resources allocated to a first one of the software components are reallocated, based on the corresponding communication profiles, to a second one of the software components different from the first one of the software components and are no longer allocated to the first one of the software components.

11. The computer unit or an interconnection of computer units as recited in claim 10, wherein at the second point in time during the switch between the two of the different operating modes, first resources, that are used for communication between a first pair of the software components and are not used for communication between a second pair of the software components different from the first pair of software components, are reallocated, based on the corresponding communication profiles of the two of the different operating mode, to the second pair of software components so that the first resources are used for communication between the second pair of the software components are not used for communication between the first pair of the software components.

12. The computer unit or an interconnection of computer units as recited in claim 11, wherein the first resources include a least one buffer and a channel.

13. The computer unit or an interconnection of computer units as recited in claim 10, wherein the communication resources include at least one buffer and a channel.

14. A non-transitory machine-readable memory medium on which is stored a computer program for providing communication between software components in a motor vehicle, the software components being operated in different operating modes, and the software components communicating with one another differently in the different operating modes, the computer program, when executed by a computing unit or interconnected computing units, causing the computer unit or interconnected computing units to perform:
  determining, at a first point in time, which of the software components communicate with one another in the different operating modes and in which way in each case, and a separate communication profile is determined, on the basis of the determining, for each one of the different operating modes;
  operating the software components in the different operating modes at a second point in time, wherein the computing unit or interconnected computing units executing the software components is configured according to a corresponding communication profile of the respective operating mode;
  wherein at the second point in time, in a switch between two of the different operating modes, a switch takes place between the corresponding communication profiles of the two of the different operating modes, and
  wherein at the second point in time, in the switch between the two of the different operating modes, communication resources are newly distributed as a function of the corresponding communication profiles of the two of the different operating mode so that the communication resources allocated to a first one of the software components are reallocated, based on the corresponding communication profiles, to a second one of the software components different from the first one of the software components and are no longer allocated to the first one of the software components.

15. The non-transitory machine-readable memory medium as recited in claim 14, wherein at the second point in time during the switch between the two of the different operating modes, first resources, that are used for communication between a first pair of the software components and are not used for communication between a second pair of the software components different from the first pair of software components, are reallocated, based on the corresponding communication profiles of the two of the different operating mode, to the second pair of software components so that the first resources are used for communication between the second pair of the software components are not used for communication between the first pair of the software components.

16. The non-transitory machine-readable memory medium as recited in claim 15, wherein the first resources include a least one buffer and a channel.

17. The non-transitory machine-readable memory medium as recited in claim 14, wherein the communication resources include a buffer and a channel.

\* \* \* \* \*